(12) United States Patent
Shriner

(10) Patent No.: US 12,306,005 B2
(45) Date of Patent: May 20, 2025

(54) VEHICULAR VISION SYSTEM WITH REDUCED MEMORY FOR ADAPTABLE GRAPHIC OVERLAYS

(71) Applicant: Magna Electronics Inc., Auburn Hills, MI (US)

(72) Inventor: Richard D. Shriner, Fenton, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 266 days.

(21) Appl. No.: 17/814,238

(22) Filed: Jul. 22, 2022

(65) Prior Publication Data

US 2023/0028593 A1    Jan. 26, 2023

Related U.S. Application Data

(60) Provisional application No. 63/203,457, filed on Jul. 23, 2021.

(51) Int. Cl.
| | | |
|---|---|---|
| *G01C 21/36* | (2006.01) | |
| *G06T 11/00* | (2006.01) | |
| *H04N 5/272* | (2006.01) | |
| *H04N 7/18* | (2006.01) | |

(52) U.S. Cl.
CPC ....... *G01C 21/3647* (2013.01); *G01C 21/365* (2013.01); *G06T 11/00* (2013.01); *H04N 5/272* (2013.01); *H04N 7/183* (2013.01)

(58) Field of Classification Search
CPC .............. G01C 21/3647; G01C 21/365; G01C 21/3632; G01C 21/3638; G06T 11/00; G06T 19/006; H04N 5/272; H04N 7/183
See application file for complete search history.

(56) References Cited

U.S. PATENT DOCUMENTS

| | | | |
|---|---|---|---|
| 4,546,551 A | 10/1985 | Franks | |
| 4,953,305 A | 9/1990 | Van Lente et al. | |
| 5,499,334 A * | 3/1996 | Staab ................. | G06F 9/44505 |
| | | | 715/802 |
| 5,530,240 A | 6/1996 | Larson et al. | |
| 5,550,677 A | 8/1996 | Schofield et al. | |
| 5,576,687 A | 11/1996 | Blank et al. | |
| 5,632,092 A | 5/1997 | Blank et al. | |
| 5,668,663 A | 9/1997 | Varaprasad et al. | |
| 5,670,935 A | 9/1997 | Schofield et al. | |
| 5,699,044 A | 12/1997 | Van Lente et al. | |

(Continued)

*Primary Examiner* — Wilson W Tsui
(74) *Attorney, Agent, or Firm* — HONIGMAN LLP

(57) ABSTRACT

A vehicular vision system includes a camera disposed at a vehicle, an electronic control unit, and a video display disposed in the vehicle. The system, responsive to processing of captured image data, displays video images on the video display. The system retrieves graphic overlay data from memory. The graphic overlay data represents a plurality of graphic overlay portions, with each graphic overlay portion being associated with a respective display portion of a plurality of display portions of the video display. Responsive to occurrence of a driving condition, the system retrieves graphic overlay data, displays the graphic overlay portions, and adjusts a transparency of one or more of the displayed graphic overlay portions such that at least one displayed graphic overlay portion is viewable by the driver and at least one other displayed graphic overlay portion is not viewable by the driver.

21 Claims, 5 Drawing Sheets

(56) References Cited

U.S. PATENT DOCUMENTS

| | | | |
|---|---|---|---|
| 5,708,410 A | 1/1998 | Blank et al. | |
| 5,724,187 A | 3/1998 | Varaprasad et al. | |
| 5,737,226 A | 4/1998 | Olson et al. | |
| 5,802,727 A | 9/1998 | Blank et al. | |
| 5,878,370 A | 3/1999 | Olson | |
| 5,949,331 A | 9/1999 | Schofield et al. | |
| 6,087,953 A | 7/2000 | DeLine et al. | |
| 6,173,501 B1 | 1/2001 | Blank et al. | |
| 6,222,447 B1 | 4/2001 | Schofield et al. | |
| 6,222,460 B1 | 4/2001 | DeLine et al. | |
| 6,329,925 B1 | 12/2001 | Skiver et al. | |
| 6,513,252 B1 | 2/2003 | Schierbeek et al. | |
| 6,611,202 B2 | 8/2003 | Schofield et al. | |
| 6,642,851 B2 | 11/2003 | Deline et al. | |
| 6,690,268 B2 | 2/2004 | Schofield et al. | |
| 7,004,593 B2 | 2/2006 | Weller et al. | |
| 7,038,577 B2 | 5/2006 | Pawlicki et al. | |
| 7,184,190 B2 | 2/2007 | McCabe et al. | |
| 7,195,381 B2 | 3/2007 | Lynam et al. | |
| 7,249,860 B2 | 7/2007 | Kulas et al. | |
| 7,255,451 B2 | 8/2007 | McCabe et al. | |
| 7,274,501 B2 | 9/2007 | McCabe et al. | |
| 7,289,037 B2 | 10/2007 | Uken et al. | |
| 7,308,341 B2 | 12/2007 | Schofield et al. | |
| 7,329,013 B2 | 2/2008 | Blank et al. | |
| 7,338,177 B2 | 3/2008 | Lynam | |
| 7,370,983 B2 | 5/2008 | DeWind et al. | |
| 7,446,650 B2 | 11/2008 | Scholfield et al. | |
| 7,581,859 B2 | 9/2009 | Lynam | |
| 7,626,749 B2 | 12/2009 | Baur et al. | |
| 7,720,580 B2 | 5/2010 | Higgins-Luthman | |
| 7,855,755 B2 | 12/2010 | Weller et al. | |
| 7,859,565 B2 | 12/2010 | Schofield et al. | |
| 8,451,107 B2 | 5/2013 | Lu et al. | |
| 8,643,724 B2 * | 2/2014 | Schofield | B60R 1/23 348/148 |
| 9,762,880 B2 | 9/2017 | Pflug | |
| 10,019,841 B2 | 7/2018 | Gibson et al. | |
| 10,179,543 B2 | 1/2019 | Rathi et al. | |
| 10,488,215 B1 * | 11/2019 | Yu | G01C 21/365 |
| 2006/0050018 A1 | 3/2006 | Hutzel et al. | |
| 2006/0061008 A1 | 3/2006 | Karner et al. | |
| 2012/0162427 A1 | 6/2012 | Lynam | |
| 2013/0042180 A1 * | 2/2013 | Sai | G09B 21/008 715/729 |
| 2013/0321629 A1 * | 12/2013 | Zhang | G06T 3/00 348/148 |
| 2013/0328922 A1 * | 12/2013 | Belanger | G06T 11/60 345/629 |
| 2014/0022390 A1 | 1/2014 | Blank et al. | |
| 2019/0204827 A1 * | 7/2019 | Bhalla | G05D 1/0061 |
| 2020/0070725 A1 * | 3/2020 | Ding | B60R 99/00 |
| 2020/0400456 A1 * | 12/2020 | Sen | G01C 21/367 |

\* cited by examiner

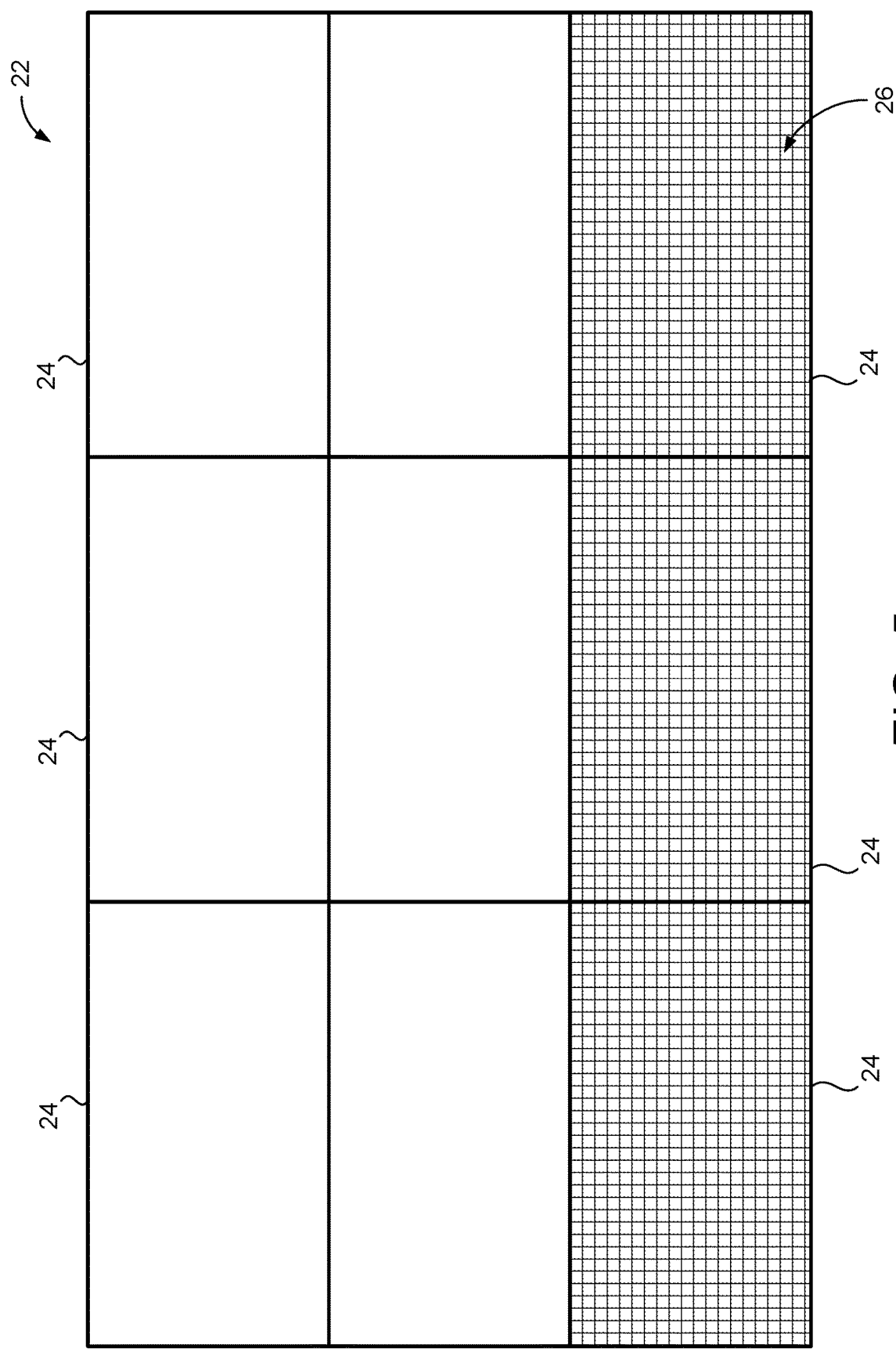

VEHICULAR VISION SYSTEM WITH REDUCED MEMORY FOR ADAPTABLE GRAPHIC OVERLAYS

CROSS REFERENCE TO RELATED APPLICATION

The present application claims the filing benefits of U.S. provisional application Ser. No. 63/203,457, filed Jul. 23, 2021, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A driving assistance system or vision system or imaging system for a vehicle utilizes one or more cameras (preferably one or more CMOS cameras) to capture image data representative of images exterior of the vehicle, and provides an electronic control unit (ECU) with electronic circuitry and associated software. The electronic circuitry of the ECU includes an image processor for processing image data captured by the camera. The system includes a video display disposed in the vehicle and viewable by a driver of the vehicle. The video display is operable to display video images derived from image data captured by the camera and includes a plurality of display portions. Each display portion of the plurality of display portions displays a respective portion of the video images. The vehicular vision system, responsive to processing by the image processor of image data captured by the camera, displays video images at the plurality of display portions of the video display. Graphic overlay data stored in memory represents a plurality of graphic overlay portions, and each graphic overlay portion of the plurality of graphic overlay portions is associated with a different respective display portion of the plurality of display portions. Each graphic overlay portion is associated with a respective driving condition of a plurality of driving conditions. Responsive to an occurrence of one of the plurality of driving conditions, the vehicular vision system (i) retrieves the graphic overlay data from memory, (ii) displays each respective graphic overlay portion of the plurality of graphic overlay portions using the associated respective display portion of the plurality of display portions and (iii) adjusts a transparency of at least one of the displayed graphic overlay portions such that one of the plurality of displayed graphic overlay portions associated with the one of the plurality of driving conditions is viewable by the driver of the vehicle when viewing the video display and others of the displayed graphic overlay portions not associated with the one of the plurality of driving conditions are not viewable by the driver of the vehicle when viewing the video display.

These and other objects, advantages, purposes and features of the present invention will become apparent upon review of the following specification in conjunction with the drawings.

BRIEF DESCRIPTION OF THE DRAWINGS

FIG. 5 is a schematic view of the display of FIG. 2 with another different portion of the display portions including a graphic overlay.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
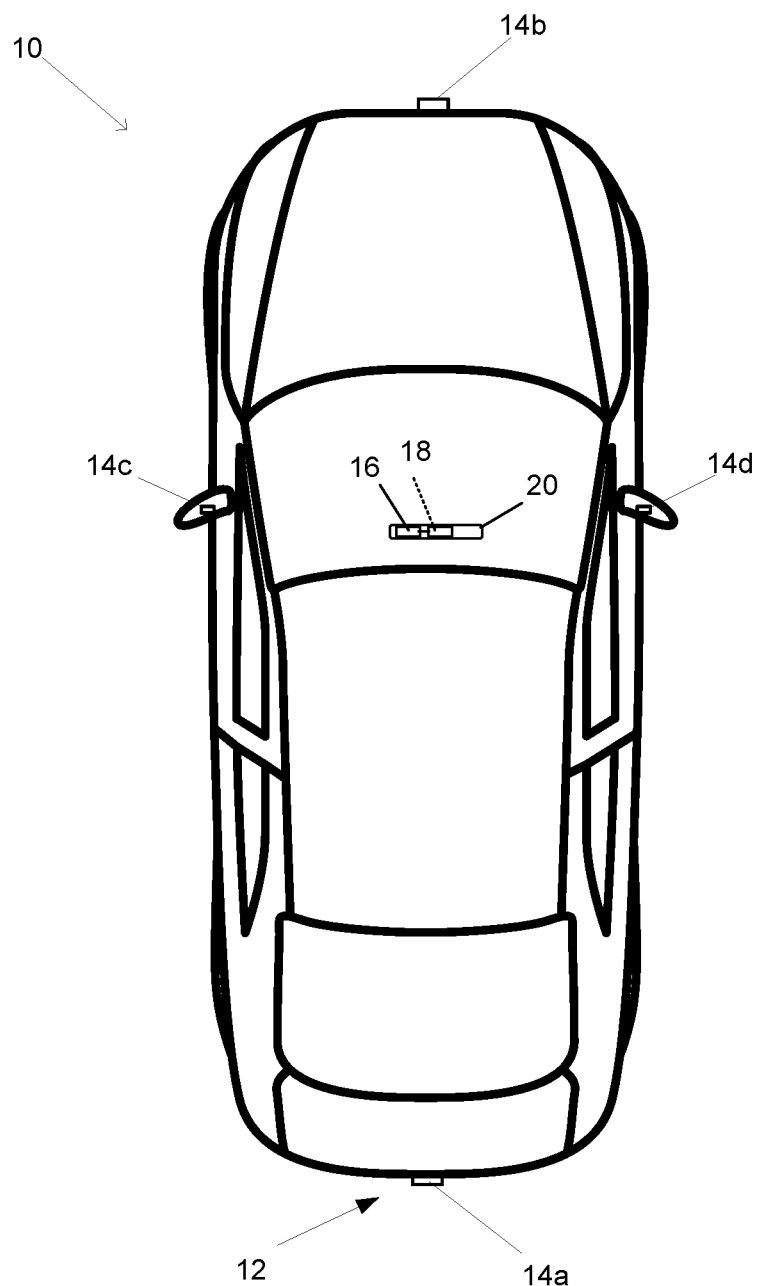
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle, such as at center console, a dashboard, a head-up display (HUD), etc.). The data transfer or signal communication from the camera to the ECU may comprise any suitable data or communication link, such as a vehicle network bus or the like of the equipped vehicle.

Many driver assist systems or vehicular vision systems or vehicular display systems may, based on various configurations, user preferences, environmental conditions, and/or vehicle inputs, overlay graphics on images displayed on a display 16 for the driver (or other occupant) to view. These overlays can be complex static or dynamic graphics that are drawn or superimposed over, for example, image data captured by a camera or other imaging sensor. For example, a rear backup system may display images captured by a rear backup camera while the vehicle is reversing, and the rear backup system may overlay graphics that indicate a current or predicted path of the vehicle based on the current steering angle or graphics that highlight one or more obstacles to avoid. Other examples include, but are not limited to, overlaying geographic information, traffic or traffic lane information, and weather condition information. These graphics can be made up of several different elements or portions.

Figure 2:
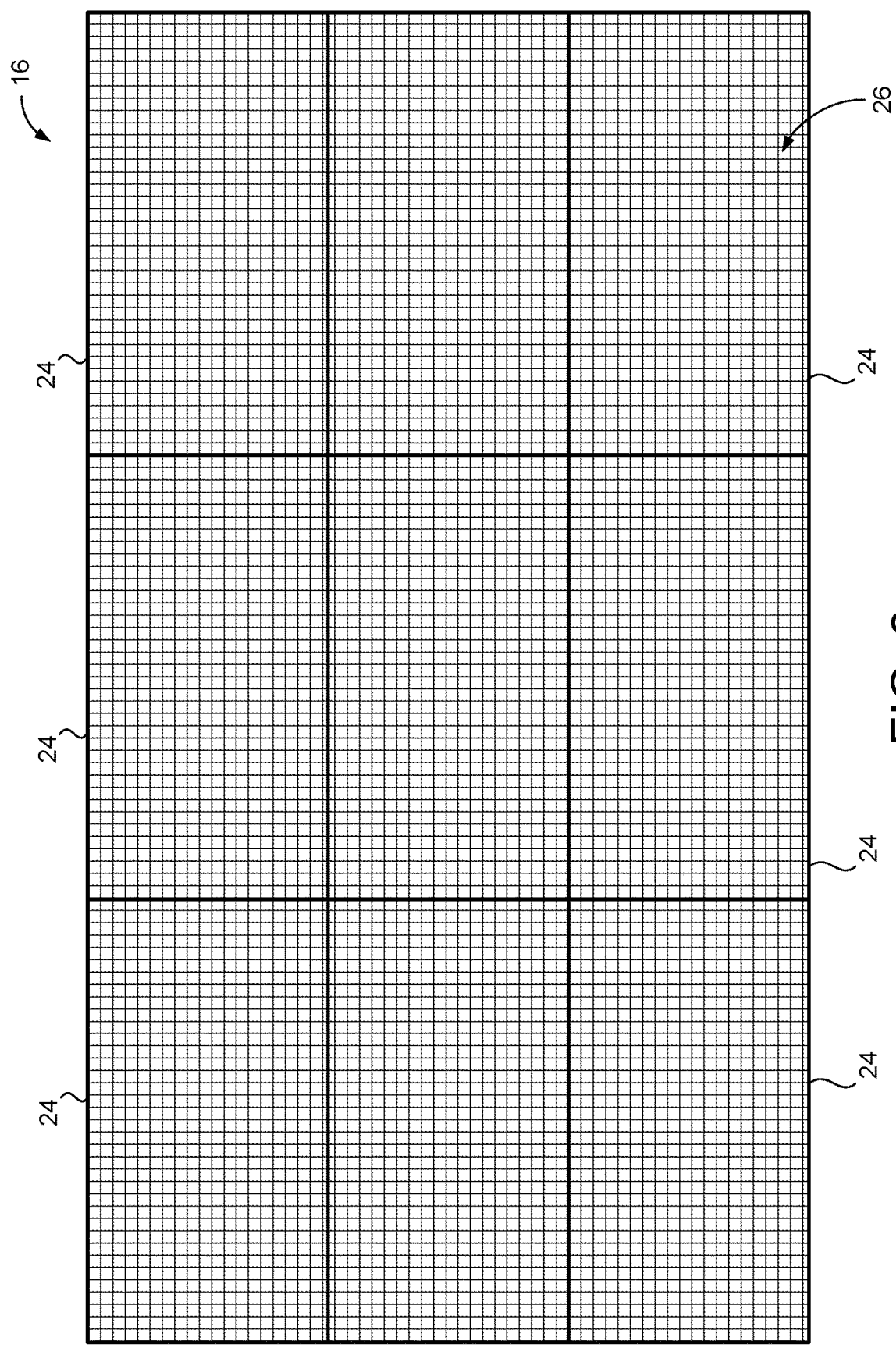
FIG. 2 is a schematic view of a display divided into a plurality of display portions with each display portion including a graphic overlay.

Referring now to FIG. 2, one or more displays (such as the display 16 of FIG. 1) are divided into a number of portions 24. Here, the display 16 is divided into nine portions 24, but the display 16 may be divided into any number of portions 24. Each portion 24 may display some or all of a graphic overlay 26 (e.g., any graphic overlaid or electronically superimposed on another image). That is, a processor or other control of the vehicle (e.g., the ECU 18, an image processor, a system on a chip (SoC), etc.) may generate some or all of a graphic overlay 26 on each portion 24 of the display 16. In the illustrated example, the crosshatch pattern indicates that the portion 24 includes at least a portion of a graphic overlay 26. Optionally, at least one of (or each of) the graphic overlays 26 is a static graphic overlay, such as navigation instructions (e.g., turn left, turn right, go straight, merge, etc.), parking assist indicators (e.g., lines indicating distances from the vehicle), and/or any number of warnings, alerts, or other notifications (e.g., weather or other environmental alerts, cross-traffic alerts, etc.).

Figure 3:
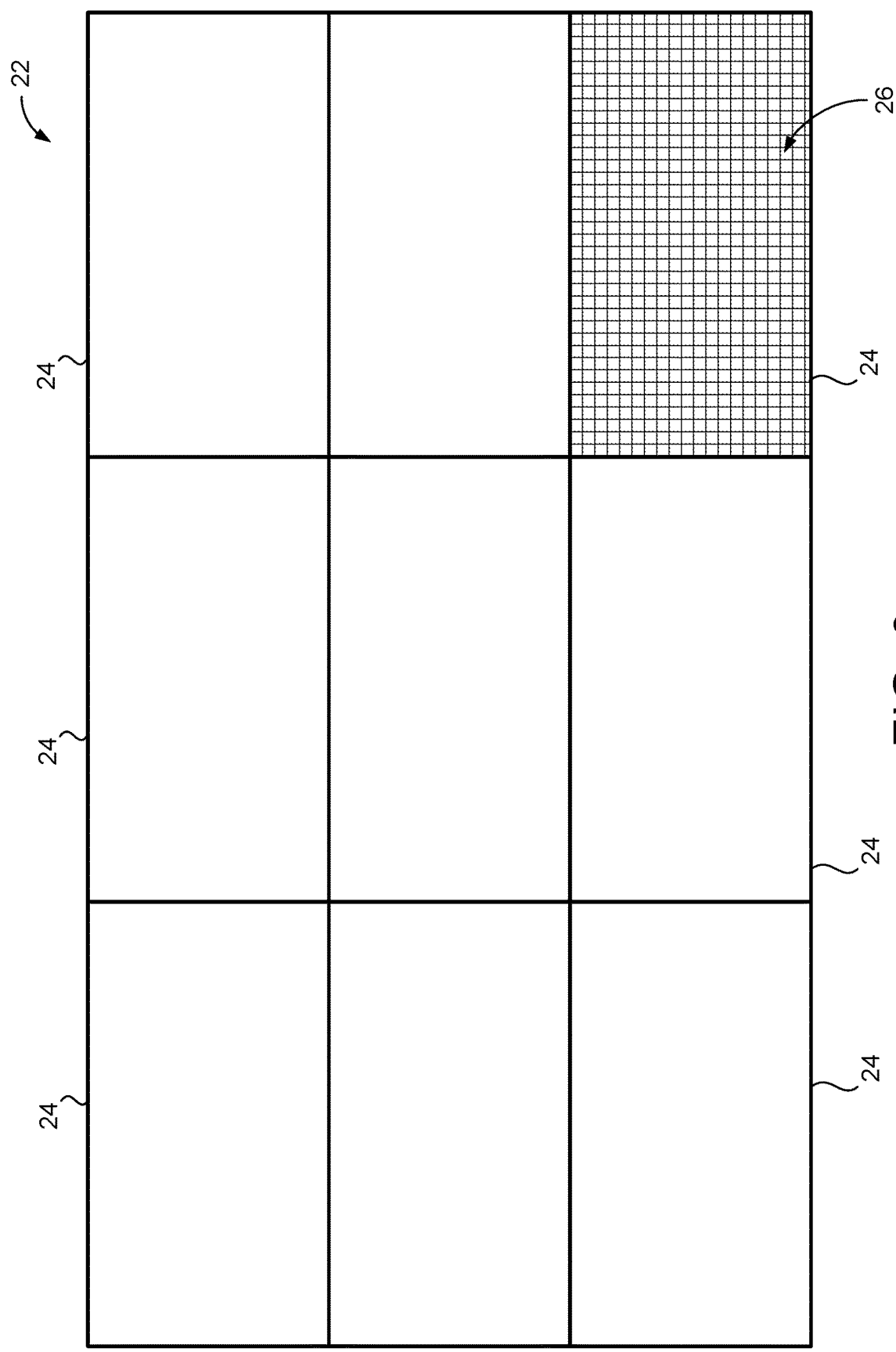
FIG. 3 is a schematic view of the display of FIG. 2 with only a portion of the display portions including a graphic overlay.
Figure 4:
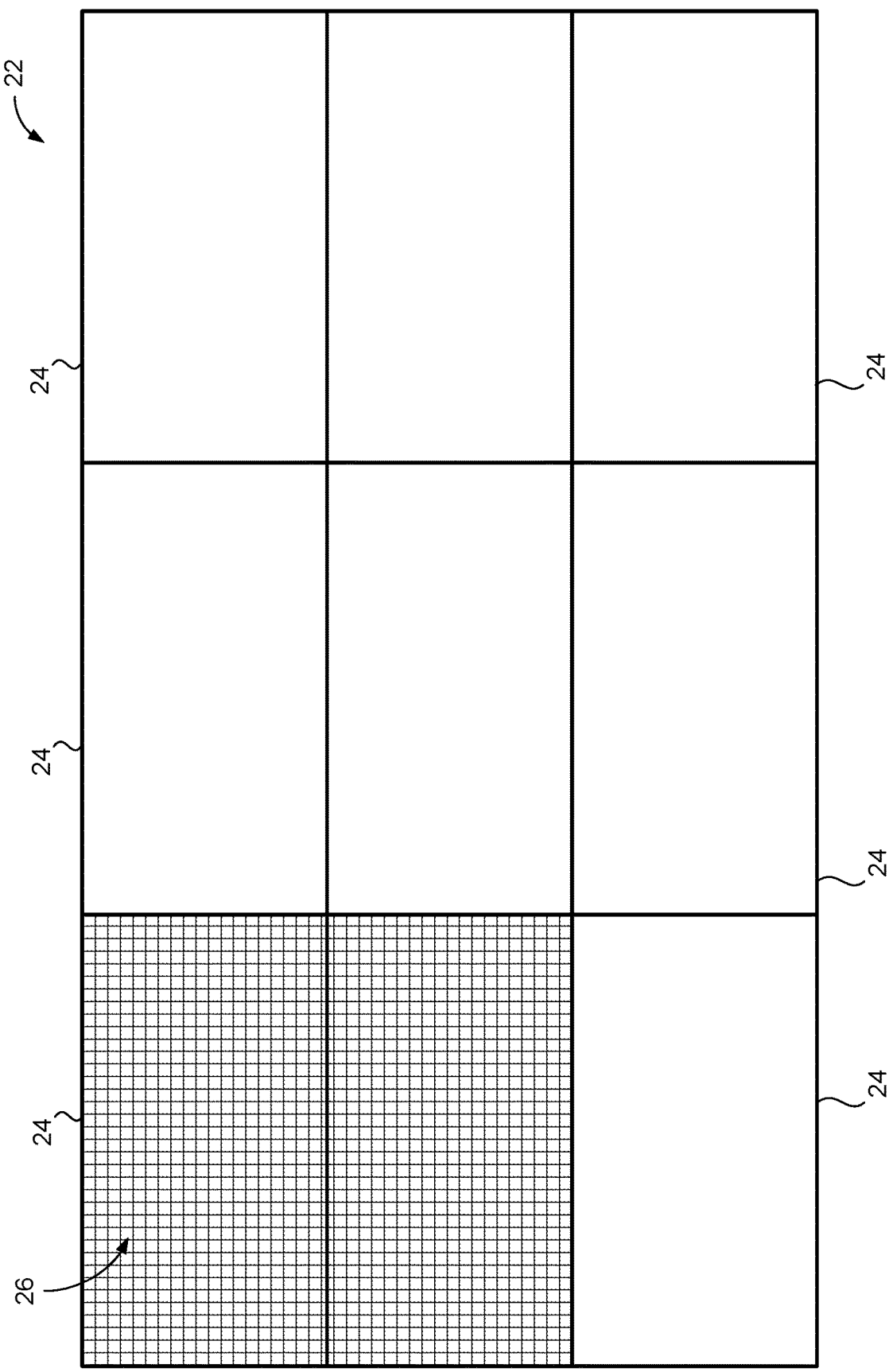
FIG. 4 is a schematic view of the display of FIG. 2 with a different portion of the display portions including a graphic overlay.

While FIG. 2 offers an example where a graphic overlay 26 is generated on each portion 24 (i.e., all nine portions 24 include at least part of a graphic overlay 26), the ECU 18 may be required to generate any combination of overlays 26 on any combination of portions 24. FIG. 3 demonstrates another example where only a single portion 24 (i.e., the bottom-right portion 24) includes a graphic overlay 26, while FIG. 4 demonstrates a third example where two different portions 24 include at least a portion of a graphic overlay 26. For example, a single graphic overlay 26 is large enough to extend across both portions and/or each portion 24 has a separate and independent graphic overlay 26. FIG. 5 demonstrates yet another example, where three different portions 24 include at least one graphic overlay 26. When the display 22 is divided into nine portions 24, as exemplified here, the ECU 18 may be responsible for generating up to 511 different combinations (i.e., 2⁹ combinations minus one for when no overlays are present) when each portion 24 is associated with just a single graphic overlay 26 (i.e., each portion 24 either has a single graphic overlay 26 present or does not have the single graphic overlay 26 present). In some examples, each portion 24 is associated with multiple different graphic overlays 26, and in these examples, the total number of different combinations can be much larger.

The graphic overlay(s) 26 of each portion may be standalone graphic overlays or may be combined with graphic overlays of other portions 24 to create a more complex overlay.

Typically, each combination of potential graphic overlays 26 is stored in external memory. For example, when the display 16 is divided into nine portion 26 and each portion 26 is associated with one potential graphic overlay 26, the system may store each of 511 different combinations into memory (e.g., flash memory, an electrically erasable programmable read-only memory (EEPROM), etc.) disposed at the vehicle. When a specific combination of graphic overlays 26 is to be displayed on the display 16, the ECU 18 retrieves the appropriate combination from the memory and then displays the retrieved combination on the display 16. However, due to the potentially large number of combinations, a large (and therefore more expensive) memory is often required.

Implementations herein include a vehicular vision system or display system that controls a transparency of each graphic overlay 26 to greatly reduce the number of combinations that must be stored in memory. That is, instead of storing each combination of graphic overlays 26 separately (e.g., 511 different combinations of this example), the system may instead store a single combination with all of the graphic overlays 26 (e.g., all nine graphic overlays 26 in this example). The system may then programmatically control the transparency (e.g., using alpha compositing or alpha blending) of each graphic overlay 26 of each portion 24 to ensure that only the desired graphic overlays 26 are visible based on the presence or selection of a particular driving condition. For example, when the driving condition includes a navigation condition or navigation mode (e.g., the user has requested assistance in navigating to a particular destination), the graphic overlays 26 may (as part of a single overlay) include indications or instructions for navigating the vehicle, such as a "turn left" indication or instruction and a "turn right" indication or instruction. As the vehicle approaches an intersection where the driver should turn the vehicle to the left, the system may ensure that the graphic overlay 26 that indicates the vehicle should turn right is transparent (i.e., not viewable) and the graphic overlay 26 that indicates the vehicle should turn left is non transparent (i.e., is viewable). The driving condition may represent any number of scenarios or conditions or situations, such as user requests (e.g., navigation modes, communication modes, etc.), weather conditions (e.g., low temperature indications, slippery condition indications, such as an indication that "roads may be icy" when the temperature is at or below around 37 degrees F., etc.), a gear of the vehicle (e.g., forward gear, reverse gear), operational status of various systems or sensors, etc.

Optionally, for example, the graphic overlay may comprise a plurality of icons or indicators that are sequentially or dynamically shown at the displayed images by making one (or two or more) of the icons or indicators visible and the rest transparent and then making a next one (or two or more) of the icons visible and the rest (including the initial one or two visible icons or indicators) transparent responsive to a change in a driving condition. For example, the graphic overlay may include a plurality of pairs of curved lines that are used to overlay rear backup camera captured images during a reversing maneuver of the vehicle. Thus, one pair of lines may be visible at a time, with the particular pair that is visible changing responsive to a change in steering angle of the vehicle. Thus, a single graphic overlay includes all of the rear backup indicator lines and the system retrieves that single graphic overlay (such as responsive to the vehicle shifting to a reverse gear or the driver otherwise selecting a reverse propulsion of the vehicle) and then adjusts transparency of the plurality of graphic overlay portions (such as responsive to a change in steering angle of the vehicle during the reversing maneuver) to indicate to the driver the projected path of reverse travel of the vehicle during the reversing maneuver.

The transparency setting controls how visible the graphic overlay 26 is to viewers of the display. For example, a graphic overlay 26 that is set to be transparent or mostly transparent will not be visible (or be less visible) and the underlying video image (i.e., the portion of the video image the graphic overlay 26 is displayed over) is visible (or at least mostly visible). When a graphic overlay 26 is set to opaque or mostly opaque (i.e., less transparent), the graphic overlay 26 will be visible to viewers of the display and the underlying video image will not be visible or at least partially less visible. The system may adjust the transparencies of the graphic overlays 26 by any amount. For example, the system, when "hiding" or masking or otherwise making a graphic overlay 26 not viewable to occupants of the vehicle, may adjust transparencies of one or more graphic overlays 26 to be greater than 70% transparent (i.e., less than 30% opaque), or greater than 80% transparent, or greater than 90% transparent, etc., and the system, when ensuring one or more graphic overlays 26 are viewable or visible to occupants of the vehicle, may adjust or set or ensure the transparency of the graphic overlays 26 are less than 50% transparent (i.e., greater than 50% opaque), or less than 30%, or less than 10%, such that the driver or occupant of the vehicle can readily view and discern the one or more, at least substantially opaque, graphic overlays while not viewing and discerning the other, at least substantially transparent, overlays.

For the combination of portions 24 including a visible graphic overlay 26 exemplified in FIG. 3, the system may fetch a combination from memory that includes a graphic overlay 26 for each of the nine portions 24, however, the system adjusts parameters of the graphic overlays 26 such that each portion 24 displays a transparent graphic overlay 26 (i.e., not viewable by a viewer) for eight of the portions 26 and does not make the associated graphic overlay 26 of the bottom-right portion 24 transparent (so that it is viewable by a viewer). The graphic overlays 26 for each portion 24 may combine with graphic overlays 26 from other portions 26 to create a single overlay with multiple elements (e.g., a rear-backup guide that crosses multiple portions 24). Alternatively, a graphic overlay 26 for a particular portion 24 may be independent from graphic overlays 26 from other portions 24 (e.g., a speed limit display that can be entirely displayed in a single portion 24).

Thus, instead of storing each combination separately, the system may store a single combination (or more when a portion 24 is associated with more than one graphic overlay 26) and then adjust the single combination as needed by adjusting a transparency or visibility of each graphic overlay 26 of each portion 24. For example, the system stores a first single combination for a first graphic overlay 26 that may extend across any number of the portions 24 and a second single combination for a second graphic overlay 26 that extends across any number of the portions 24. The portions 24 used by the first graphic overlay 26 may be the same or different than the second graphic overlay 26. Thus, the system may essentially "enable" or "disable" the respective graphic overlay(s) 26 of each portion 24 without the need to store every combination separately. The system may store metadata (such as a table) indicating the parameters (e.g., the transparency parameters) values for each potential combination, which requires far less storage that storing the actual combinations that include the graphic overlays 26. For example, the system could store a lookup table or the like and reference the lookup table to determine the transparency parameter values for a specific combination.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 10,099,614; 10,071,687; 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-

0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The vision system includes a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:
    a camera disposed at a vehicle equipped with the vehicular vision system, the camera viewing exterior of the vehicle and capturing image data;
    an electronic control unit (ECU) comprising electronic circuitry and associated software;
    wherein the electronic circuitry of the ECU comprises an image processor for processing image data captured by the camera;
    a video display disposed in the vehicle and viewable by a driver of the vehicle, wherein the video display is operable to display video images derived from image data captured by the camera, and wherein the video display is divided into a plurality of display portions, and wherein each display portion of the plurality of display portions displays a different respective portion of the video images, and wherein each display portion of the plurality of display portions does not overlap with any other display portion of the plurality of display portions;
    wherein the vehicular vision system, responsive to processing by the image processor of image data captured by the camera, displays video images at the plurality of display portions of the video display;
    wherein graphic overlay data stored in memory represents a plurality of graphic overlay portions, and wherein each graphic overlay portion of the plurality of graphic overlay portions is associated with only a single respective display portion of the plurality of display portions, and wherein each graphic overlay portion is associated with a respective driving condition of a plurality of driving conditions; and
    wherein, responsive to an occurrence of one of the plurality of driving conditions, the vehicular vision system (i) retrieves the graphic overlay data from memory, (ii) displays each graphic overlay portion of the plurality of graphic overlay portions at the associated single respective display portion of the plurality of display portions and (iii) adjusts a transparency of at least one of the displayed graphic overlay portions such that each displayed graphic overlay portion associated with the one of the plurality of driving conditions has a respective transparency that is less than a respective transparency of each displayed graphic overlay portion not associated with the one of the plurality of driving conditions, such that each displayed graphic overlay associated with the one of the plurality of driving conditions is viewable by the driver of the vehicle when viewing the video display and each displayed graphic overlay portion not associated with the one of the plurality of driving conditions is not viewable by the driver of the vehicle when viewing the video display.

2. The vehicular vision system of claim 1, wherein the vehicular vision system retrieves the graphic overlay data from nonvolatile memory disposed at the vehicle.

3. The vehicular vision system of claim 1, wherein the plurality of display portions comprises at least nine display portions.

4. The vehicular vision system of claim 1, wherein the vehicular vision system adjusts the transparency of the at least one displayed graphic overlay portion using alpha compositing.

5. The vehicular vision system of claim 1, wherein at least two of the plurality of displayed graphic overlay portions form a single graphic overlay.

6. The vehicular vision system of claim 1, wherein the vehicular vision system retrieves graphic overlay metadata from the memory, and wherein the graphic overlay metadata comprises a transparency parameter for each display portion, and wherein the vehicular vision system adjusts the transparency of the at least one displayed graphic overlay portion based on the corresponding transparency parameter.

7. The vehicular vision system of claim 6, wherein the graphic overlay metadata is stored within a table.

8. The vehicular vision system of claim 6, wherein the graphic overlay metadata is stored within a lookup table.

9. The vehicular vision system of claim 1, wherein the graphic overlay data comprises only a single combination of graphic overlay portions.

10. The vehicular vision system of claim 1, wherein the displayed video images comprise video images of a region rearward of the vehicle, and wherein, while the vehicle is in a reverse gear, one or more plurality of displayed graphic overlay portions comprise a rear backup guide overlay.

11. The vehicular vision system of claim 1, wherein one of the respective driving conditions comprises a navigation condition, and wherein individual graphic overlay portions of the plurality of graphic overlay portions are associated with respective navigation instructions as the vehicle travels along a route to a targeted destination.

12. The vehicular vision system of claim 11, wherein the individual graphic overlay portions of the plurality of displayed graphic overlay portions associated with the one of the respective driving conditions comprises a navigation instruction graphic overlay indicating a particular recommended navigation maneuver.

13. The vehicular vision system of claim 1, wherein each graphic overlay portion of the plurality of graphic overlay portions comprises a respective static graphic overlay portion.

14. A vehicular vision system, the vehicular vision system comprising:
   a camera disposed at a vehicle equipped with the vehicular vision system, the camera viewing exterior of the vehicle and capturing image data;
   an electronic control unit (ECU) comprising electronic circuitry and associated software;
   wherein the electronic circuitry of the ECU comprises an image processor for processing image data captured by the camera;
   a video display disposed in the vehicle and viewable by a driver of the vehicle, wherein the video display is operable to display video images derived from image data captured by the camera, and wherein the video display is divided into a plurality of display portions, and wherein each display portion of the plurality of display portions displays a different respective portion of the video images, and wherein each display portion of the plurality of display portions does not overlap with any other display portion of the plurality of display portions;
   wherein the vehicular vision system, responsive to processing by the image processor of image data captured by the camera, displays video images at the plurality of display portions of the video display;
   wherein graphic overlay data stored in memory represents a plurality of graphic overlay portions, and wherein each graphic overlay portion of the plurality of graphic overlay portions is associated with only a single respective display portion of the plurality of display portions, and wherein each graphic overlay portion is associated with a respective driving condition of a plurality of driving conditions;
   wherein, responsive to an occurrence of one of the plurality of driving conditions, the vehicular vision system (i) retrieves the graphic overlay data from memory and (ii) displays each respective graphic overlay portion of the plurality of graphic overlay portions at the associated respective display portion of the plurality of display portions;
   wherein the displayed plurality of graphic overlay portions comprise at least a first graphic overlay portion and a second graphic overlay portion;
   wherein, responsive to the occurrence of the one of the plurality of driving conditions, the vehicular vision system adjusts a transparency of at least one selected from the group consisting of the first graphic overlay portion and the second graphic overlay portion;
   wherein the first graphic overlay portion of the displayed plurality of graphic overlay portions is associated with the one of the plurality of driving conditions, and wherein the first graphic overlay portion, based on the transparency of the first graphic overlay portion, is viewable by the driver of the vehicle when viewing the video display;
   wherein the second graphic overlay portion is not associated with the one of the plurality of driving conditions, and wherein the second graphic overlay portion of the displayed plurality of graphic overlay portions, based on the transparency of the second graphic overlay portion, is not viewable by the driver of the vehicle when viewing the video display; and
   wherein the transparency of the first graphic overlay portion is less than the transparency of the second graphic overlay portion.

15. The vehicular vision system of claim 14, wherein the vehicular vision system retrieves the graphic overlay data from nonvolatile memory disposed at the vehicle.

16. The vehicular vision system of claim 14, wherein the plurality of display portions comprises at least nine display portions.

17. The vehicular vision system of claim 14, wherein the vehicular vision system adjusts the transparency of the at least one displayed graphic overlay portion using alpha compositing.

18. The vehicular vision system of claim 14, wherein at least two of the plurality of displayed graphic overlay portions form a single graphic overlay.

19. A vehicular vision system, the vehicular vision system comprising:
   a camera disposed at a vehicle equipped with the vehicular vision system, the camera viewing exterior of the vehicle and capturing image data;
   an electronic control unit (ECU) comprising electronic circuitry and associated software;
   wherein the electronic circuitry of the ECU comprises an image processor for processing image data captured by the camera;
   a video display disposed in the vehicle and viewable by a driver of the vehicle, wherein the video display is operable to display video images derived from image data captured by the camera, and wherein the video display is divided into a plurality of display portions, and wherein each display portion of the plurality of display portions displays a different respective portion of the video images, and wherein each display portion of the plurality of display portions does not overlap with any other display portion of the plurality of display portions;
   wherein the vehicular vision system, responsive to processing by the image processor of image data captured by the camera, displays video images at the plurality of display portions of the video display;
   wherein graphic overlay data stored in memory represents a plurality of graphic overlay portions, and wherein each graphic overlay portion of the plurality of graphic overlay portions is associated with only a single respective display portion of the plurality of display portions, and wherein each graphic overlay portion is associated with a respective driving condition of a plurality of driving conditions, and wherein the graphic overlay data comprises only a single combination of graphic overlay portions; and
   wherein, responsive to an occurrence of one of the plurality of driving conditions, the vehicular vision system (i) retrieves the graphic overlay data from memory, (ii) displays each respective graphic overlay portion of the plurality of graphic overlay portions at the associated respective display portion of the plurality of display portions and (iii) adjusts, using alpha compositing, a transparency of at least one of the displayed graphic overlay portions such that each displayed graphic overlay portion associated with the one of the plurality of driving conditions has a respective transparency that is less than a respective transparency of each displayed graphic overlay portion not associated with the one of the plurality of driving conditions, such that each displayed graphic overlay associated with the one of the plurality of driving conditions is viewable by the driver of the vehicle when viewing the video display and each displayed graphic overlay portion not associated with the one of the plurality of driving conditions is not viewable by the driver of the vehicle when viewing the video display.

20. The vehicular vision system of claim 19, wherein each graphic overlay portion of the plurality of graphic overlay portions comprises a respective static graphic overlay portion.

21. The vehicular vision system of claim 19, wherein at least two of the plurality of displayed graphic overlay portions form a single graphic overlay.

* * * * *